Oct. 22, 1968 R. S. KLEIN 3,407,389

INPUT BUFFER

Filed Sept. 24, 1965 3 Sheets-Sheet 1

INVENTOR.
RONALD S. KLEIN

BY Ernest J. Weinberger
John M. Pearce

ATTORNEYS

INVENTOR
RONALD S. KLEIN

BY Ernest J. Weinberger
John M. Pease
ATTORNEYS

Oct. 22, 1968 R. S. KLEIN 3,407,389

INPUT BUFFER

Filed Sept. 24, 1965 3 Sheets-Sheet 3

INVENTOR.
RONALD S. KLEIN
BY Ernest J. Weinberger
John M. Pease
ATTORNEYS

United States Patent Office 3,407,389

Patented Oct. 22, 1968

3,407,389
INPUT BUFFER

Ronald S. Klein, Cherry Hill, N.J., assignor, by mesne assignments, to the United States of America as represented by the Secretary of the Navy Filed Sept. 24, 1965, Ser. No. 490,147
8 Claims. (Cl. 340—172.5)

ABSTRACT OF THE DISCLOSURE

A Teletype input buffer including a pair of flip-flop registers and an input gate therefor connected to reset and start the registers counting only when a proper start bit is sensed.

This invention relates to the transmission and receipt of Teletype signals and more particularly to an input buffer for processing these received Teletype signals and for enabling the information to be sampled and fed into an associated mechanism such as a digital computer.

In the transfer of binary coded intelligence or information, the signals representing code characters are arranged in selected groups each having therein a number of variable information signals and a pair of signals designated as start and stop invariant elements. These last-mentioned elements differentiate the sequential groups. In the transmission of information the signals are synchronously cycled between the initiation "start" signal and the "stop" signal. Thus the signal levels are processed on a bit-by-bit basis starting with the initial transition and terminating with the stop transition.

Two deficiencies are apparent in most presently employed systems. The first being the fact that where the input signal has not, as yet, included the initial transition the input buffer will transmit or process what might be termed "garbage." This garbage can consist of input noise bursts or interference. Secondly, the input buffers will continue to process between groups since they lack a system or sufficient time to check and detect for complete start and stop bits.

In view of the foregoing, it is an object of this invention to provide an inexpensive, simple, and reliable Teletype input buffer which will not transmit or process spurious signals or "garbage" and which may be used with presently available Teletype communication equipment.

Another object of this invention is to provide a Teletype input buffer which will hold the received information bits for at least several bit times and check for complete start and stop bits and which necessitates a minimum of components.

A further object is to provide an input buffer which employs standard logical components and which at the termination of each character group provides for the transfer of the information to an associated computer.

Other objects and advantages will appear from the following description of an example of the invention, and the novel features will be particularly pointed out in the appended claims.

Figure 1:
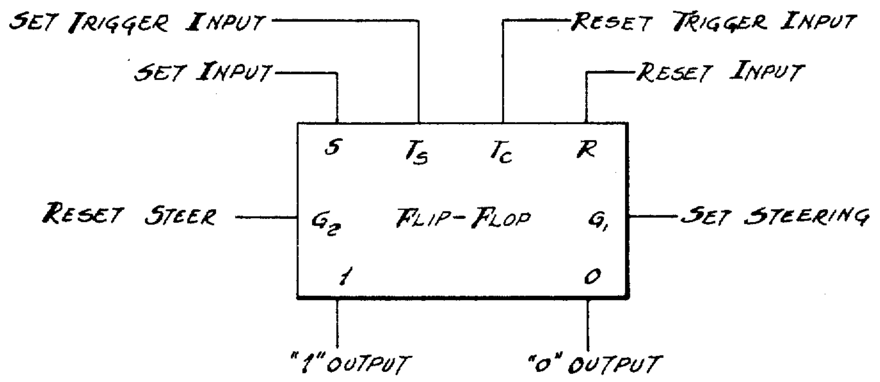
Figure 2:
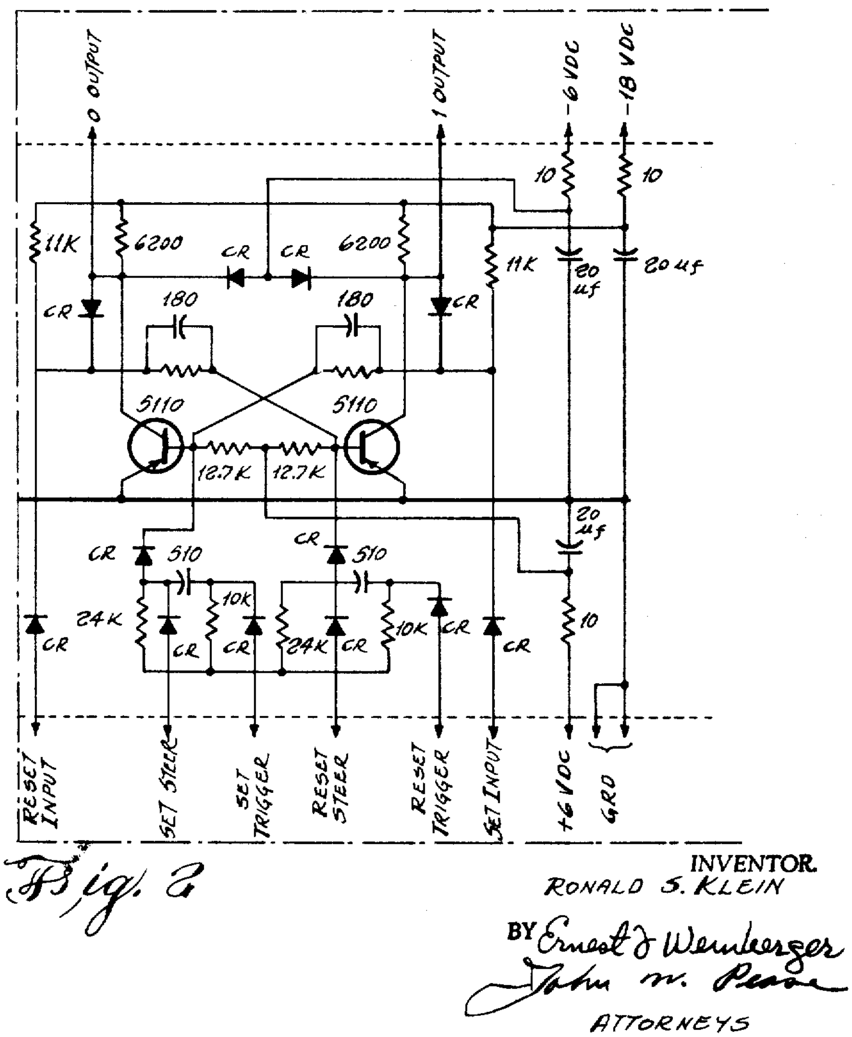
Figure 3:
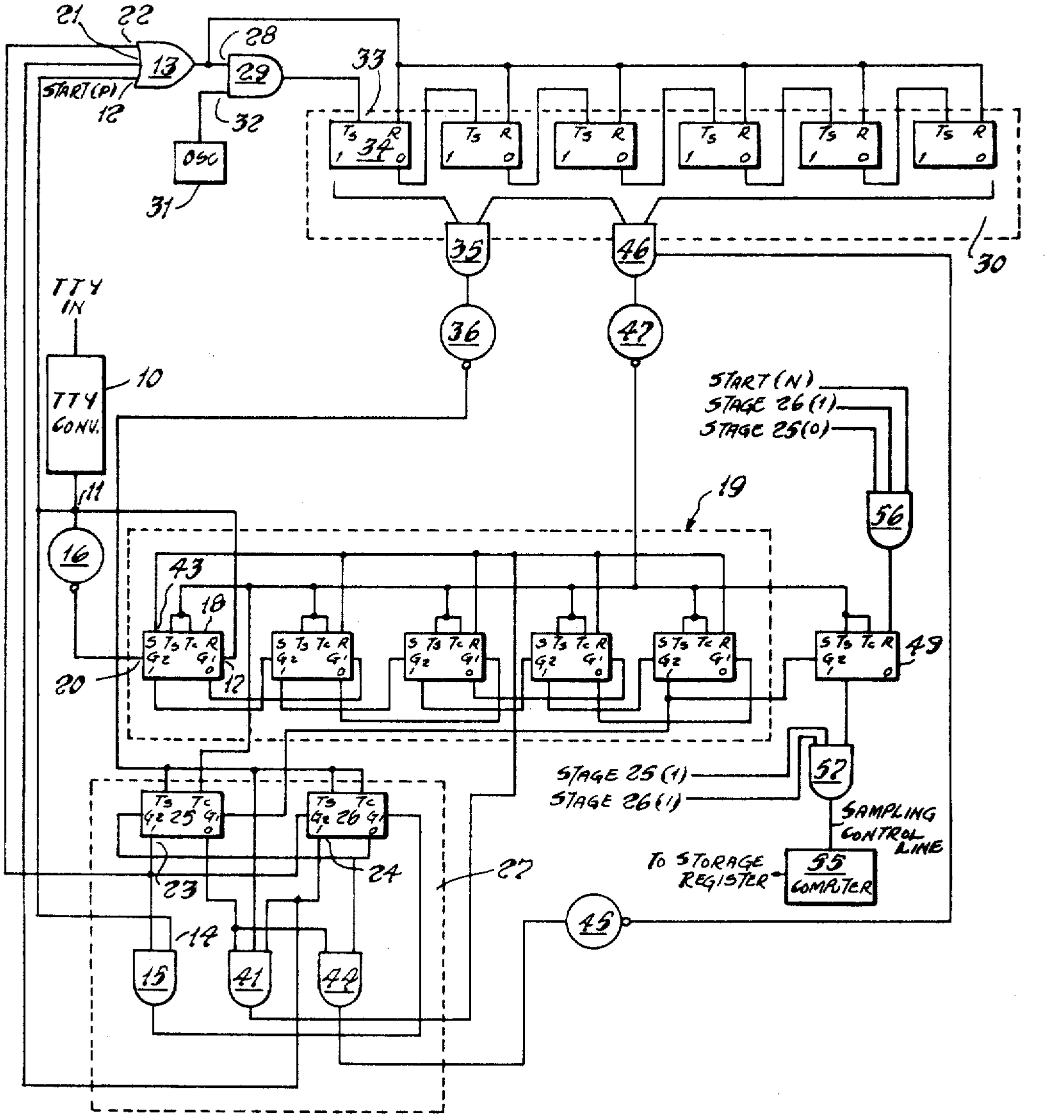
Figure 2:
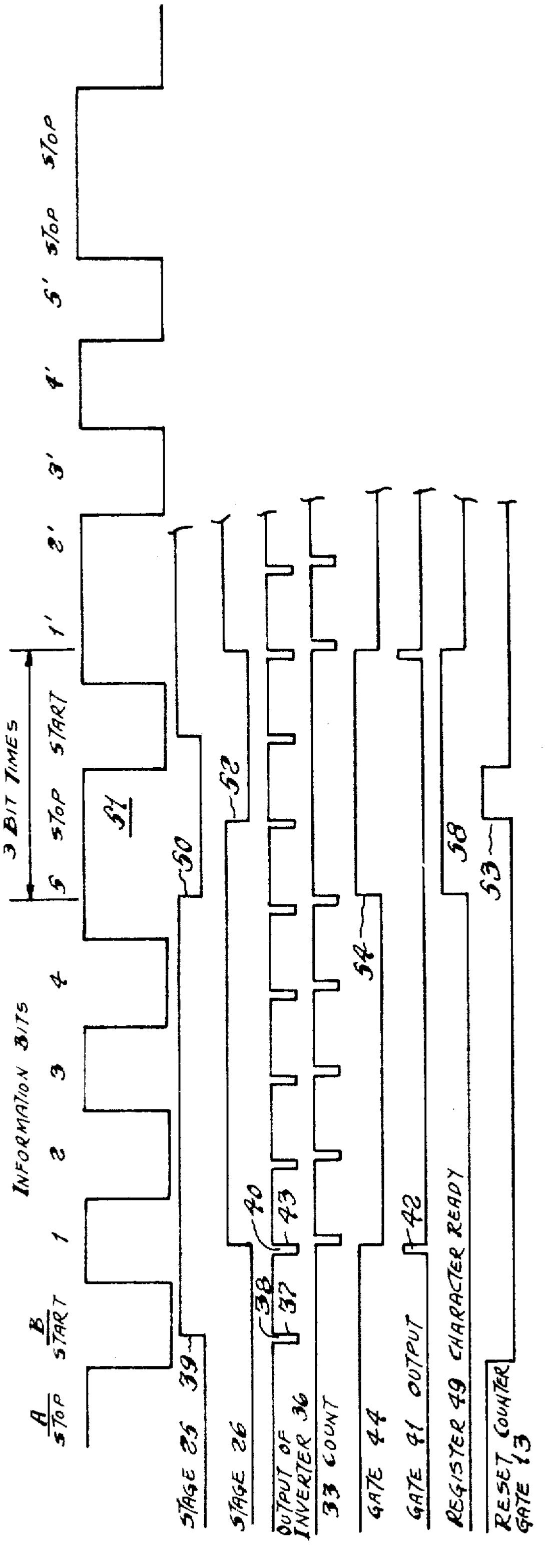

In the accompanying drawings:

FIG. 1 is a block representation of a typical flip-flop logic circuit showing the various external connections thereto, FIG. 2 is a schematic diagram of a typical flip-flop logic circuit showing the components thereof, FIG. 3 is a block logic diagram of an embodiment made in accordance with the principles of this invention; and FIG. 4 is a time sequence chart indicating the states and operation of the embodiment illustrated in FIG. 3.

FIGS. 1 and 2 illustrate a typical logic flip-flop circuit which may be employed as a component of the invention embodiment shown in FIG. 3. The flip-flop shown is provided with a plurality of terminals which in this case consists of eight external connections. The terminology, designation, and operation of this circuitry is both well known and understood so that an explanation thereof has been deleted in this specification. Although the circuit employs transistor and other solid state components, tubes could be substituted therefor where space and power considerations permit.

In the illustrated embodiment of the invention, as shown in FIG. 3, the Teletype signal information which consists of a series of square waves "bits," is initially applied to a standard Teletype converter 10 which effectively produces an inverted, amplified and corrected output at 11. The converter output is simultaneously applied to one input 12 of gate 13 and one input 14 of gate 15, to inverter 16 and to the set steer input 17 of the first flip-flop stage 18 of storage shift register 19. The inverted output which corresponds to the converter input is fed into the reset steer input 20 of stage 18. The other two inputs 21 and 22 of gate 13 are connected to the "1" outputs 23 and 24 of flip-flops 25 and 26 of control circuit 27. The output of gate 13 is connected to the one input 28 of gate 29 and to the reset inputs of the flip-flops comprising the count register 30. Oscillator or pulse generator 31 provides a series of time repetitive pulses to input 32 of gate 29. The output of gate 29 is applied to trigger input 33 of the first flip-flop 34 of the count register 30.

Initially it is assumed that stages 25 and 26 are reset and that a stop bit or marking situation is present on the input line to the buffer. This corresponds to column A of FIG. 4. With stages 25 and 26 reset and a stop bit present the count register 30 is reset by gate 13 since all the inputs thereto are low level and the output is high. With the receipt of the initial "start" bit (see FIG. 4, column B), gate 13 is disabled by a high input and its low output permits gate 29 to become enabled and thereby allow count register 30 to commence counting the input from oscillator 31. Thirty count recognition gate 35 samples the counter stages and produces a pulse output which is inverted at 36 and applied to the set trigger input of stage 25. The positive going edge 37 of the 30 count pulse 38 sets the stage 25 as at 39 and holds gate 13 disabled. On the second 30 count pulse stage 26 is set by the trailing edge of pulse 40. The "0" output of stage 25, which is low level, and the "1" output of stage 26 which is also low or "0" at the time the leading negative going edge of pulse 40 is present, as well as the pulse 40 itself, are applied as the input to gate 41. Therefore, just before stage 26 is set, gate 41 produces a high level pulse output which is applied to the reset inputs of all the stages of shift register 19 except the first stage 18. For this stage the gate 41 pulse 42 is fed to the set input 43 so as to preset this register to 10000.

It should be noted that the term "30 count" is based on the timing operation of the Teletype system employed. In general one common known form of transmission allows a fixed period for each "bit" and if this period is divided into individual count time periods, as for example, where 33 counts at a selected rate would correspond to one-half the bit time, then equally well, one could discern 30 counts. All that is required is that the oscillator 31 be locked to or synchronized with the transmission clock or timing. With the initiation of the start bit (see FIG. 4) the counting commences and since the 30 count is used, stage 25 is set generally before the center of this first start bit is reached. If instead of a "start" bit an interfering pulse or "garbage" is received and the count is started, stage 25 will not be set until 30 counts are reached which is a period in excess of the duration of an interfering pulse. This precludes false operation due to "garbage" on the line and sensitizes the buffer, only when the "start" information is present for at least a 30 count period.

With the receipt of the positive going trailing edge 43 of the second 30 count pulse 40 stage 26 is set. Now at approximately the center of the first data or information bit (1) gate 41 has preset storage shift register 19, and stages 25 and 26 are set. The setting of these stages produces a low level at the "0" outputs of these states which are connected to 33 count control gate 44. This control gate 44 produces an output which after inversion at inverter 45 is applied to 33 count recognition gate 46 and primes it. When the 33 count is reached the pulse output at gate 46 passes through inverter 47 and is applied to the trigger set and reset inputs of the stages of storage register 19. These "33" count pulses allow data to be shifted into and along the storage register 19 from the converter 10.

The successive input bits (1–5) are shifted into register 19 under the control of the "33" count pulse output and are shifted down from one stage to the next succeeding stage. When the last of the five information bits have been shifted into register 19 the "1" bit which was preset into the storage register at the second 30 count is shifted into flip-flop or register 49 and also into the stage 25 where it causes this stage to be reset (50). Since the stage 25 has been reset, control gate 44 is no longer primed and gate 46 is disabled so as to remove the "33" count pulse and prevent further data shifting into the storage register. At this point stage 25 is reset and stage 26 set. Stop bit 51 is sensed by stage 26 and resets this stage to zero (52). With both of these stages in the reset state and the stop bit sensed count register 30 is reset via gate 13 as at (53) waiting for the next start bit.

This entire cycle of operation is commenced again when the next "start" bit is sensed. It should be noted that control gate 44 disables gate 46 which governs the shifting of information bits into the storage register from approximately the middle of the last or 5th information bit (see FIG. 4, 54) until the middle of the first information bit of the next character group (1′–5′). Thus a character can be held for at least three bit times while the line is checked for a "start" and "stop" bit.

Flip-flop or register 49 is used to signal the computer 55 that the buffer is full and at the same time it prevents further sampling of the buffer until a new character group has been sensed. Gate 56 receives as its input the states of stages 25 and 26 and the start (N) absence signal. The output thereof is applied to the reset input of register 49. As per FIG. 4, it is clear that after the last (5th) data bit is received, but before the stop bit is received, the inputs to gate 56 are as shown for stages 25 and 26 with "no start" input. This gate 56 therefore resets register 49 if the bit immediately following the last data bit is not a "stop" bit. On the other hand, if the bit is a "stop" bit then gate 56 will not reset register 49 but gate 57 will produce an output to the computer 55. Gate 57 is primed only after a "stop" and "start" bit have been received since this is when stages 25 and 26 are in their proper states. The timing diagram of FIG. 4 shows the time relationship of the buffer to the data and a typical time period 58 during which the aforementioned sequence takes place. With gate 57 connected in the signal line to the computer and gate 56 for resetting, the computer is not signalled unless a "stop" and a "start" bit have been sensed and the register 49 is further used to record the fact that the buffer has been sampled by the computer.

The buffer described hereinabove will operate at all standard teletype speeds by merely changing or selecting the proper oscillator rate. The following equations govern stages 25 and 26 and control the entire buffer:

| Stage | Stage 26 | |
|---|---|---|
| 0 | 0 | Stop bit detected previously or general reset. |
| 1 | 0 | 30 count of start bit (almost middle of start bit) |
| 1 | 1 | 30 count of first data bit at this time preset is generated just prior to setting register to 11. |
| 0 | 1 | Preset bit detected=5 data bits have been shifte into storage register 19. |

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. In a Teletype binary data processing system having an input converter, a counter register having a pair of outputs, a storage memory register connected to said input, and having one of said counter outputs connected to said storage register to set said storage register for each group of counts, that improvement in an input buffer which includes:

a pair of flip-flop registers having their input connected to the other of said counter outputs, an input gate means having connected to the input thereof the outputs of each of said flip-flops and the output of said converter and having its output connected to reset said count register and to permit said count register to count dependent on the state input thereto, whereby when a "start" bit is sensed on said input said count register will count and the flip-flop will be set thereby and maintain the continuing timing after said "start" bit is withdrawn.

2. The improvement according to claim 1, wherein said input gate means includes:

a first gate connected to receive the outputs of said flip-flops and said converter, an oscillator, a second gate connected to the output of said first gate and to pass the output of said oscillator to said counter only when the output of said first gate is in one state, output of said first gate connected to reset said counter register when the output is in the other state.

3. The improvement according to claim 2, wherein said one of said counter outputs provides a count repetition rate equal to approximately the timing width of said binary data and said other of said counter outputs provides a count repetition rate less than said timing width.

4. In a Teletype binary data processing system for an "N" unit code, having an input converter, a count register including a gated oscillator having a pair of outputs, one output providing a count of repetition rate equal to one bit time and the other output less than one bit time, a storage register having "N" series stages and an output register stage, and wherein said input converter is connected to said storage register and said one output is connected to successively set said storage register, that improvement which comprises a pair of flip-flop register means for gating said oscillator after the initial "start" bit and having the input thereto connected to said other count output, whereby both flip-flop register means will be set after the second count, first gate means connected between said one counter output and the set inputs of said storage register, and means enabling the same after the second successive count ouput of said other counter output, second gate means connected to receive the outputs of said flip-flop register means and the input converter and connected to preset a "1" bit into the first stage of said storage register and to reset the other stages thereof, whereby when "N" bits are stored in said storage register said output stage will be signalled.

5. The improvement according to claim 4, wherein said second gate means includes a gate having three inputs and one output, said output being connected to the set input of said first stage of said storage register and the reset input of the other stages, one of said inputs connected to the output of said other counter output, and the other two connected one to each of said flip-flops whereby said storage register will be preset on the occurrence of the second count output of said other counter output after said start bit is received.

6. The improvement according to claim 5, wherein said first gate and enabling means includes an output gate having a pair of inputs one each connected to the outputs of said flip-flops, a controlled gate having its control terminal connected to the output of said output gate, whereby said storage register will only be set when the first information bit is received after the start bit.

7. The improvement according to claim 6, further including means for generating an output signal at said output register stage when "N" information code bits have been received and both a start and stop bit have subsequently been received whereby said output signal may signal a computer for sampling said storage register.

8. The improvement according to claim 7, wherein said generating means includes a reset gate having its inputs connected to the outputs of said flip-flops and to the output of said converter and its output to reset said output register stage, a computer having a sampling control input, a sampling gate, having its inputs connected to said flip-flop outputs and the output of said output register stage, said output of said sampling gate connected to said sampling control input of said computer.

References Cited

UNITED STATES PATENTS

| | | | |
|---|---|---|---|
| 2,985,865 | 5/1961 | Merz | 340—172.5 |
| 3,012,230 | 12/1961 | Galas et al. | 340—172.5 |
| 3,051,787 | 8/1962 | Parks | 340—172.5 X |
| 3,348,209 | 10/1967 | Brooks | 340—172.5 |
| 3,350,697 | 10/1967 | Hirvela | 340—172.5 |

PAUL J. HENON, *Primary Examiner.*